(12) United States Patent  (10) Patent No.: US 7,410,126 B2
Drost  (45) Date of Patent: Aug. 12, 2008

(54) TUNABLE ACOUSTIC ABSORPTION SYSTEM FOR AN AIRCRAFT CABIN

(75) Inventor: Stuart K. Drost, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 20 days.

(21) Appl. No.: 11/017,241

(22) Filed: Dec. 20, 2004

(65) Prior Publication Data

US 2008/0099609 A1   May 1, 2008

(51) Int. Cl.
    *B64C 1/40* (2006.01)
(52) U.S. Cl. .................................. 244/117 R; 244/119
(58) Field of Classification Search ............. 244/117 R, 244/133, 119, 118.5; 181/290–292, 202, 181/204; 52/788.1
    See application file for complete search history.

(56) References Cited

U.S. PATENT DOCUMENTS

| | | | |
|---|---|---|---|
| 2,802,764 A * | 8/1957 | Games et al. ................ 181/291 |
| 3,141,206 A * | 7/1964 | Stephens .................... 52/788.1 |
| 3,160,549 A * | 12/1964 | Caldwell et al. ......... 428/317.3 |
| 3,215,225 A * | 11/1965 | Kirschner ................... 181/290 |
| 3,221,835 A | 12/1965 | Wenger |
| 4,340,129 A | 7/1982 | Salyers |
| 4,373,608 A * | 2/1983 | Holmes ...................... 181/202 |
| 4,456,092 A | 6/1984 | Kubozuka et al. |
| 4,705,139 A * | 11/1987 | Gahlau et al. ............... 181/290 |
| 4,848,514 A * | 7/1989 | Snyder ....................... 181/290 |
| 4,930,285 A * | 6/1990 | Ward ....................... 52/742.12 |
| 4,940,112 A | 7/1990 | O'Neill |
| 5,039,567 A | 8/1991 | Landi et al. |
| 5,175,401 A * | 12/1992 | Arcas et al. ................. 181/292 |
| 5,300,178 A * | 4/1994 | Nelson et al. ............... 156/292 |
| 5,445,861 A | 8/1995 | Newton et al. |
| 5,472,760 A * | 12/1995 | Norvell ....................... 428/71 |
| 5,557,078 A | 9/1996 | Holwerda |
| 5,670,758 A | 9/1997 | Borchers et al. |
| 5,691,037 A | 11/1997 | McCutcheon et al. |
| 5,700,527 A | 12/1997 | Fuchs et al. |
| 5,779,193 A * | 7/1998 | Sloan ..................... 244/117 R |
| 5,824,974 A | 10/1998 | Campbell |
| 6,007,026 A | 12/1999 | Shorey |
| 6,024,190 A | 2/2000 | Ritzema |
| 6,213,430 B1 | 4/2001 | Spandorf |
| 6,224,020 B1 | 5/2001 | Hopkins et al. |
| 6,231,710 B1 | 5/2001 | Herup et al. |
| 6,260,660 B1 | 7/2001 | Yoerkie, Jr. et al. |
| 6,648,100 B2 * | 11/2003 | Ebbitt ........................ 181/293 |
| 7,040,575 B2 * | 5/2006 | Struve et al. ............. 244/118.5 |
| 2004/0055813 A1* | 3/2004 | Tsuiki et al. ................ 181/204 |

\* cited by examiner

*Primary Examiner*—Timothy D. Collins
(74) *Attorney, Agent, or Firm*—Carlson, Gaskey & Olds

(57) ABSTRACT

A tunable acoustic absorption system according to the present invention includes an airframe batting area; a primary soundproofing blanket area; an interior trim panel area; and a hard trim area, which are layered over an aircraft outer skin. Specifically tailoring or "tuning" materials within each area to the particular aircraft acoustic signature achieves significant increases in acoustic absorption achieved over conventional generic sound treatments.

24 Claims, 4 Drawing Sheets

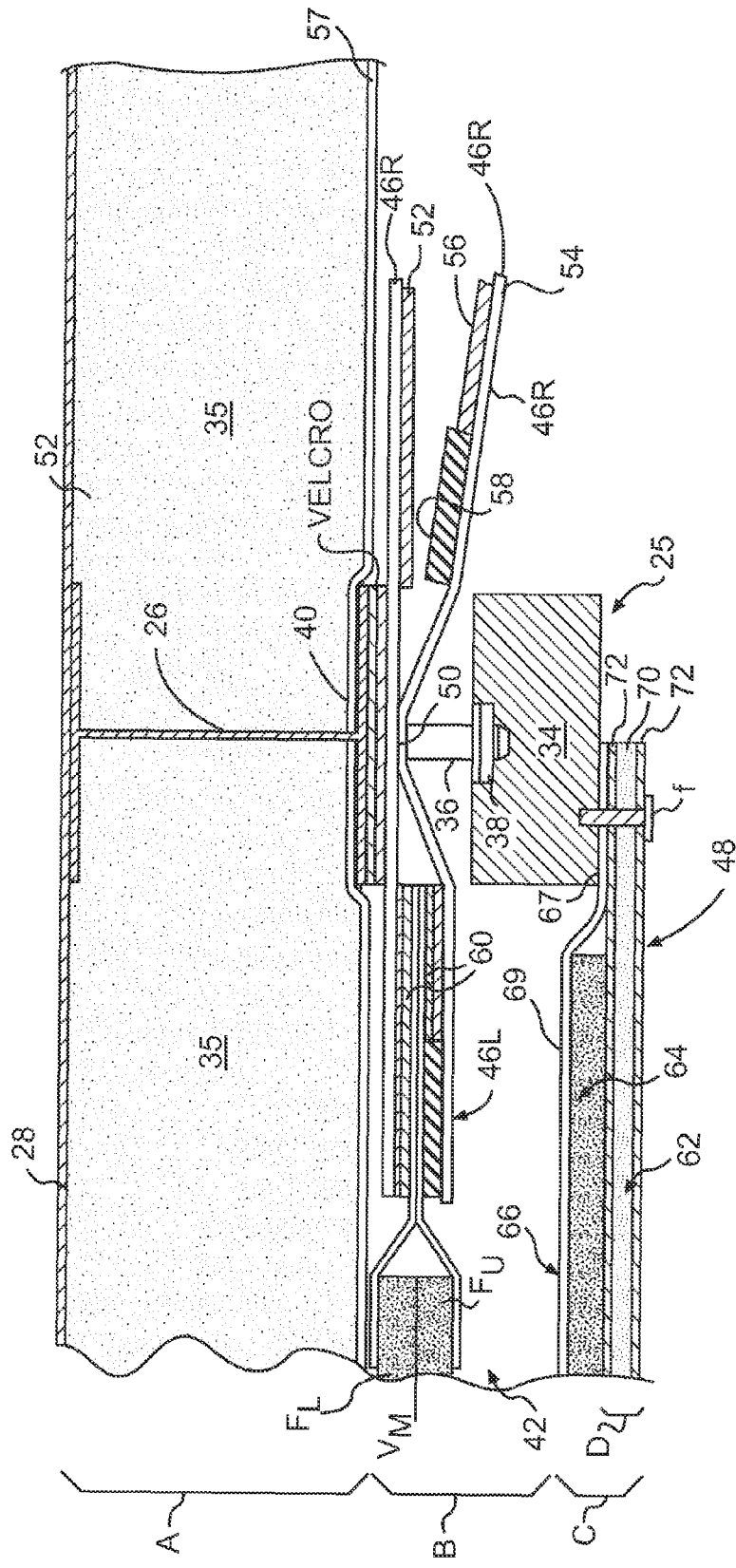

US 7,410,126 B2

TUNABLE ACOUSTIC ABSORPTION SYSTEM FOR AN AIRCRAFT CABIN

BACKGROUND OF THE INVENTION

The present invention relates to a noise reduction treatment for an aircraft cabin, and more particularly to an acoustic absorption system which is specifically tailored to particular aircraft types.

Noise develops in an aircraft cabin from several sources. The most common sources are internally or externally mounted moving components, such as a transmission, engine or rotor system. Another source of cabin noise is air flows over various aircraft fuselage components. These components generate vibrations in the aircraft that propagate through the airframe and radiate into the cabin.

Noise may be a particular problem in rotary wing aircraft cabins since the rotor and transmission systems produce a significant amount of vibration directly into the airframe structure. One main noise problem in helicopter cabins is mid to high frequency gear whine noise from the main transmission. This results in cabin noise vibrations typically from about 350 Hz through 4,000 Hz. In contrast noise vibrations from the main and tail rotor sources are in the 20 Hz to 125 Hz range and are attenuated by up to 40+dB by the response of the human ear.

Aircraft cabin interiors are generally designed to maintain aircraft interior noise below a certain level predetermined by competitive pressures in the marketplace. For example, executive transport rotary wing aircraft typically provide a design average noise level limit with the environmental control system (fans, vent air and cooling/heating system) turned off of approximately 75 dB SIL4. The SIL4 (Speech Interference Level 4) noise measurement metric is the arithmetic average of the sound pressure levels in the 500, 1000, 2000 and 4000 Hz octave bands. It rates steady noise according to interference with conversation between two people.

Various acoustic absorption systems have been provided to reduce noise levels within the cabin to below desired SIL4 values. Each of these systems, however, is typically manufactured independent of an aircraft type. Although quite effective in generally, particular aircraft types produce particular noise signatures which may not be amenable to a single generic acoustic absorption system.

Accordingly, it is desirable to provide a lightweight, acoustic absorption system which may be specifically tailored to particular aircraft types.

SUMMARY OF THE INVENTION

A tunable acoustic absorption system according to the present invention includes an airframe batting area; a primary soundproofing blanket area; an interior trim panel area; and a hard trim area. Each aircraft type has particular acoustic signatures which requires particular combinations of material to address the particular acoustic signature. Specifically tailoring or "tuning" materials within each area to the particular aircraft acoustic signature achieves significant increases in acoustic absorption achieved over conventional generic sound treatments.

The present invention therefore provides a lightweight, acoustic absorption system which may be specifically tailored to particular aircraft types.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a sectional view of an acoustic absorption blanket mounting system according to the present invention.

DETAILED DESCRIPTION OF THE PREFERRED EMBODIMENT

Figure 1:
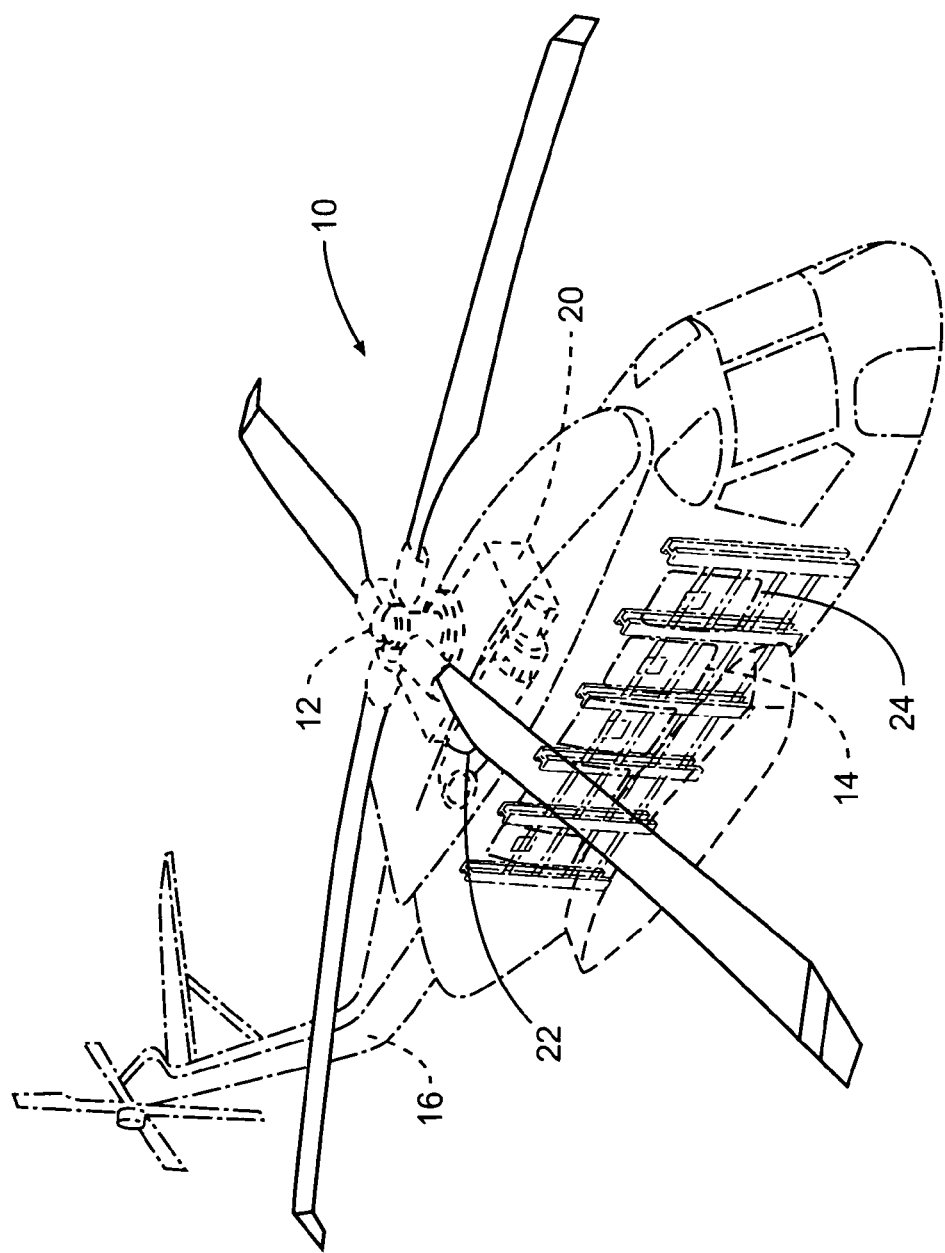
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other rotary-wing machines such as turbo-props, tilt-rotor and tilt-wing aircraft will also benefit from the present invention.

Figure 2A:
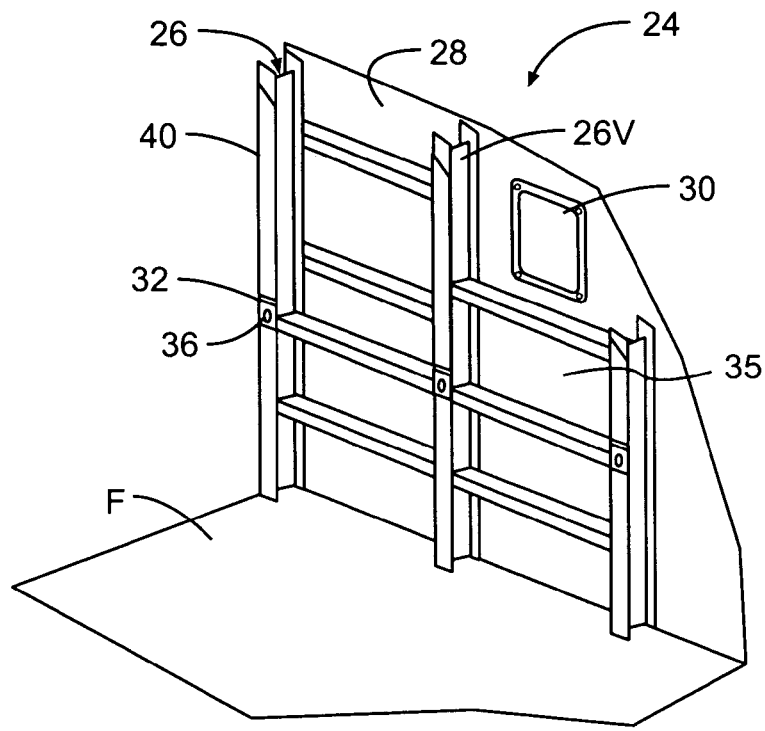
FIG. 2A is a perspective view of an airframe section.

Referring to FIG. 2A, an airframe section 24 includes a multitude of frame members 26 which support an outer skin 28 and a tunable acoustic absorption system 25 opposite the outer skin 28.

The airframe section 24 is the outer structure of the aircraft 10 and may include one or more window areas 30. The window areas 30 are typically located through the outer skin 28 between the multitude of frame members 26. The multitude of frame members 26 are typically arranged in a rectilinear pattern, however, any arrangement may be used with the present invention.

Figure 2B:
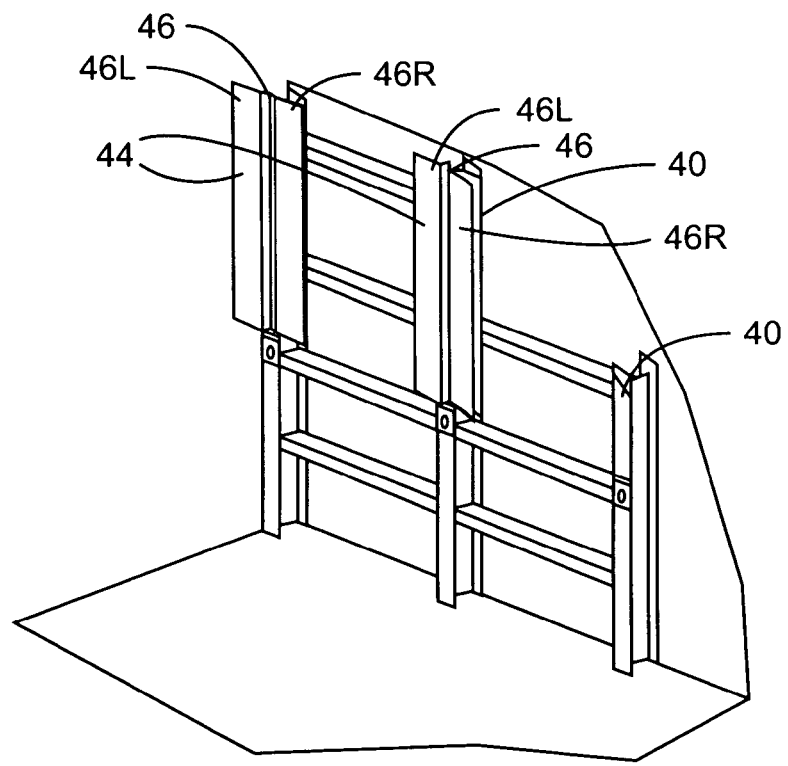
FIG. 2B is a perspective view of an airframe section of FIG. 2A with a blanket mounting strip attached to designated airframe member.
Figure 2C:
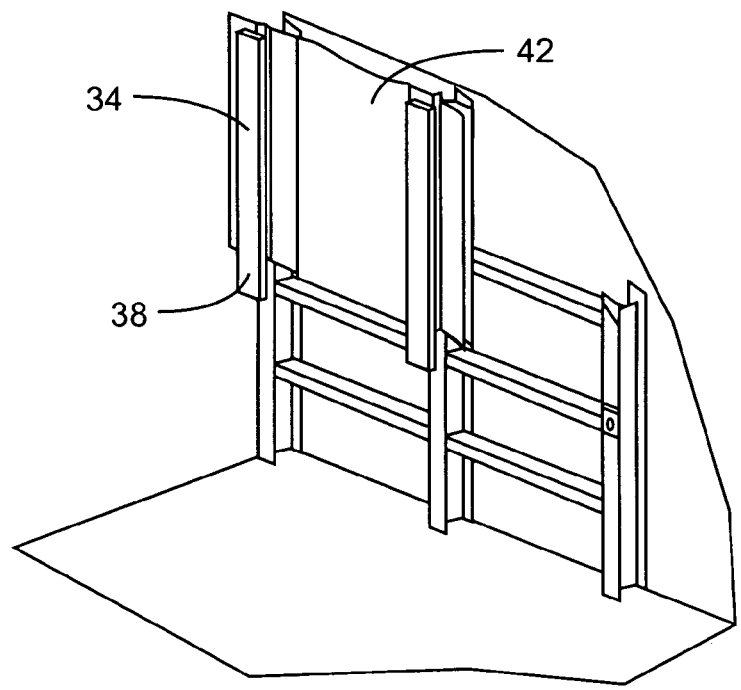
FIG. 2C is a perspective view of an airframe section of FIG. 2B with a soundproofing blanket mounted to the blanket mounting strips and internal skeleton members attached to designated airframe member.

The multitude of frame members 26 supports a multitude of interior skeleton mounts 32 which support an interior skeleton structure 34 (FIG. 2C). The interior skeleton mounts 32 preferably include posts 36 to receive corresponding receivers 38 located in the interior skeleton structure 34 such that the interior skeleton structure 34 essentially "snaps" in place. The interior skeleton structure 34 is preferably manufactured of composite materials.

The multitude of frame members 26 include hook and loop fastener strips 40 mounted to the frame members 26. The fastener strips 40 are bonded directly to the frame members 26 between the interior skeleton mounts 32. Preferably, the fastener strips 40 are arranged vertically relative to the aircraft cabin floor F in a parallel arrangement along each vertical frame member 26v to which a sound proofing blanket 42 (FIG. 2C) is installed.

Referring to FIG. 2B, a blanket mounting strip (BMS) 44 is attached to the fastener strip 40. The BMS 44 is attached to the fastener strip 40 through a hook and loop strip 46 to provide removable attachment to the fastener strip 40. The BMS 44 is generally of a "><" shape to removably capture a sound proofing blanket 42 between the opposed pair of wings 46L, 46R thereof (also illustrated in FIG. 3).

Figure 2D:
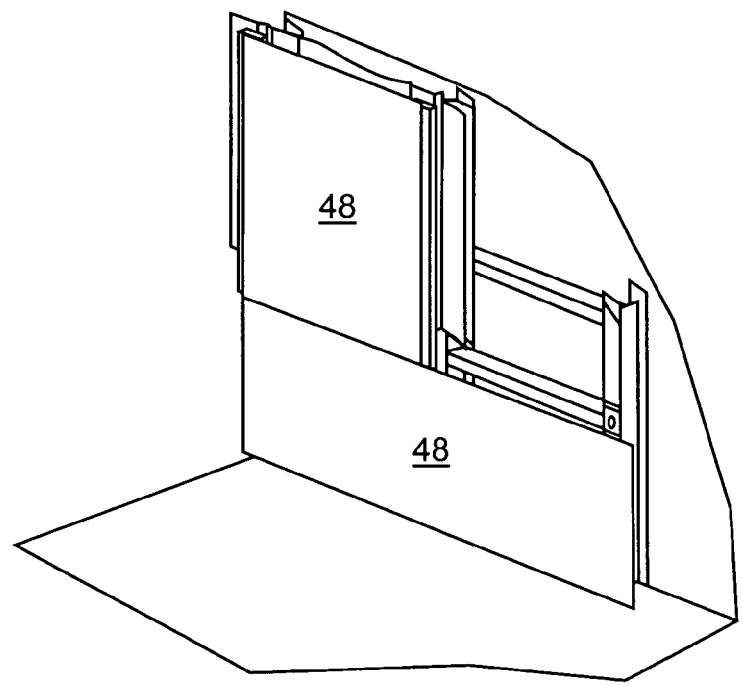
FIG. 2D is a perspective view of an airframe section of FIG. 2C with interior trim panels mounted to the internal skeleton members.

Referring to FIG. 2D, the interior skeleton structure 34 is mounted to the interior skeleton mounts 32 to generally overlap and provide for additional retention of the BMS 44 to the fastener strip. For further understanding of other aspects of the BMS and associated components thereof, attention is directed to U.S. patent application Ser. No. 11/017,564 entitled "ACOUSTIC ABSORPTION BLANKET MOUNTING SYSTEM FOR AN AIRCRAFT CABIN," which is assigned to the assignee of the instant invention and which is hereby incorporated herein in its entirety.

The interior skeleton structure 34 provides support and attachment for a multitude of acoustic absorption trim panels 48 through fasteners f such as quarter turn fasteners or the like.

Referring to FIG. 3, the tunable acoustic absorption system 25 according to the present invention is illustrated in cross-section. The acoustic absorption system 25 is generally segregated into four areas, however, a greater or lesser number of areas will also benefit from the present invention. From the outer skin 28 inward to the aircraft cabin, the areas are defines as: an airframe batting area A; a primary soundproofing blanket area B; an interior trim panel area C; and a hard trim area D. Each aircraft type has particular acoustic signatures which requires particular combinations of material to address the particular acoustic signature. By specifically tailoring or "tuning" materials within each area A-D to the particular aircraft acoustic signature, significant increases in acoustic absorption is achieved over conventional generic sound treatments. It should be understood that "tuning" as used herein is achieved through acoustic testing and modeling on a specific aircraft type. By building the acoustic absorption system areas in each area a layer arrangement may be specifically tuned to the aircraft type and to each of the preceding layers such that an optional SIL 4 value is achieved within the aircraft cabin.

In area A, the multitude of frame members 26 defines a multiple of frame voids 52. The frame voids 52 are effectively spaces adjacent the outer skin 28 for a depth defined by the frame members 26. The frame voids 52 are each filled with a foam portion 35 and covered with a mass barrier layer 57 which is adhered over the foam portions 35 and to the multitude of frame members 26. For further understanding of other aspects of the foam batting and associated components thereof, attention is directed to U.S. patent application Ser. No. 11/017,602 entitled "ACOUSTIC ABSORPTION SYSTEM FOR AN AIRCRAFT AIRFRAME," which is assigned to the assignee of the instant invention and which is hereby incorporated herein in its entirety.

The foam portion 35 is preferably a Polyimide Foam, Solimide, such as Degussa AG Solimide® TA-301 Polyimide Foam which is a lightweight foam that had both fire-resistant and posse's acoustical properties. Solimide foam commonly used in military applications and is also known as MIL-T-24708. The foam portions 35 are each interference or "force" fit into the frame voids 52.

The mass barrier layer 57 is preferably a single layer of virgin (high grade) vinyl which is mass loaded with barium sulfate powder, or similar dense material to increase its mass, and has a thickness of approximately 1/16 to 1/4 inches such as DURASONIC manufactured by Duracoat Corp. of Riverside, Calif., U.S.A. While vinyl is the preferred material because of its limpness, high inherent damping and relatively high density, the mass barrier layer 57 can be made from a variety of alternate materials, such as silicone or rubber sheet material. The materials used are selected on the basis of limpness, lowest stiffness, high relative surface density, resistance to fire, low levels of toxic fume emission when exposed to flame, expense, etc.

The mass barrier layer 57 is preferably tuned in density of the layer to the specific acoustic output generated by the aircraft 10.

In area B, the blankets 42 typically include a sandwich structure including a lower foam layer F2, a vinyl mass barrier layer Vm, and an upper foam layer Fu. A vapor barrier made from a polyvinyl fluoride material sold by E. I. du Pont De Nemours and Company under the trade name TEDLAR surrounds the sandwich structure to prevent handling damage to the foam layers and prevent fluid absorption (water, oil, hydraulic fluid, etc.) by the foam layers.

The blankets 42 are preferably tuned in thickness of material layers and the density of the layers to the specific acoustic output generated by the aircraft 10. Spacing between the blanket mass layers was determined to specifically address particular aircraft noise signatures to avoid resonance band pass at a particular frequency such that adverse acoustic attenuation was avoided. Applicant also determined that a high loft decoupling layer added between the blanket mass layers enhanced attenuation performance by absorption and retained performance of limp mass barrier otherwise lost due to the rigid acoustic foams previously employed. Thermal and burn through protection are also enhanced from the material characteristics of the high loft material.

One pair of wings 46R will be described, however it should be understood that opposed pair of wings 46L are constructed in a similar manner. A first wing 46Ra of the pair of wings 46R includes a wing hook and loop strip 52 sewn to a BMS base material layer 54. The base material layer 54 is generally of the "><" shape and manufactured of a material such as that of the soundproofing blanket 42. A second wing 46Rb opposed to the first wing 46Ra of the pair of wings 46R includes a wing hook and loop strip 56 and an acoustic gasket strip 58 preferably manufactured of a foam and sewn to the BMS base material layer 54. The hook and loop strip 56 and the acoustic gasket strip 58 are generally parallel with the acoustic gasket strip 58 located adjacent a central intersection 50.

The blanket 42 includes opposed blanket hook and loop strips 60 (one shown). The opposed blanket hook and loop strips 60 correspond to the wing hook and loop strips 52, 56 such that the blanket is retained between the wings 46Ra, 46Rb. The acoustic gasket strip 58 minimizes acoustic leakage heretofore experienced in soundproofing blanket attachments.

In area C, the acoustic absorption trim panel 48 includes a composite core 62, a decoupler layer 64, and a mass barrier layer 66. The composite core 62 defines the outer aesthetic surface visible by a passenger within the aircraft cabin and alone defines area D.

The decoupler layer 64 is preferably a high loft decoupling material such as felted Nomex. The decoupler layer 64 is located adjacent the composite core 62. The decoupler layer 64 is preferably adhered to the composite core 62. The mass barrier layer 66 is mounted to the composite core 62 to at least partially surround the decoupler layer 64.

The mass barrier layer 66 is preferably made from virgin (high grade) vinyl which is mass loaded with barium sulfate powder, or similar dense material to increase its mass, and has a thickness of approximately 1/16 to 1/4 inches. While vinyl is the preferred material because of its limpness, high inherent damping and relatively high density, the mass barrier layer 66 can be made from a variety of alternate materials, such as silicone or rubber material.

The mass barrier layer 66 includes an attachment area 67 which is adhered to the composite core 62 and a limp area 69 which is adjacent the decoupler layer 64. The limp area 69 is generally parallel to the composite core 62 to sandwich the decoupler layer 64 therebetween. By ensuring that the mass barrier layer 66 remains limp in the limp area 69 but in contact through the decoupling layer 64, damping greater than that imparted in conventional construction is achieved. The attachment area 67 provides a more rigid area which permits receives a fastener f therethrough to removably secure the acoustic absorption trim panels 48 to the interior skeleton structure 34. For further understanding of other aspects of the acoustic absorption trim panel and associated components thereof, attention is directed to U.S. patent application Ser. No. 11/017,281 entitled "ACOUSTIC ABSORPTION SYSTEM FOR AN AIRCRAFT INTERIOR TRIM PANEL SYSTEM," which is assigned to the assignee of the instant invention and which is hereby incorporated herein in its entirety.

The mass barrier layer 66 is preferably tuned in mass to the specific acoustic output generated by the aircraft 10 while the decoupler layer 64 is preferably tuned in thickness to the specific acoustic output generated by the aircraft 10.

In area D, the composite core 62 includes a core material 70 faced by skins 72. The material choice and the thickness of the core material 70 as well as the material type of skins 72 is preferably tuned to the specific acoustic output generated by the aircraft 10. Testing has discovered that a honeycomb core material 70 regardless of skin type provided less attenuation in the desired frequency range than a rigid foam core. Testing also revealed that the weight, strength and acoustic attenuation differences between Fiberglass, Kevlar and Carbon Fiber core material does not greatly influence skin choice with regard to acoustic absorption. Skin choice, however, became more relative when attempts were made to incorporate damping. Because stiffness of materials plays an important role in vibration resonance damping, the amount of imparted damping increased and the damping application weight decreased when applied to fiberglass skins.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An acoustic absorption system for an aircraft cabin comprising:
    an airframe batting mounted adjacent an airframe frame member;
    a primary soundproofing blanket mounted to said airframe frame member and at least partially over said airframe batting; and
    an interior trim panel mounted to said airframe frame member and at least partially over said primary soundproofing blanket.

2. The system as recited in claim 1, wherein said interior trim panel is mounted to an interior skeleton member, said interior skeleton member mounted to said airframe frame member.

3. The system as recited in claim 1, wherein said airframe batting includes a foam portion and a mass barrier layer bonded over said foam portion.

4. The system as recited in claim 1, wherein said primary soundproofing blanket includes material layers tuned in thickness and density of the layers to the specific acoustic output generated by the aircraft.

5. The system as recited in claim 1, wherein said interior trim panel includes a mass barrier layer mounted to a composite core to at least partially surround a decoupler layer.

6. The system as recited in claim 5, wherein said mass barrier layer is tuned in mass to a specific acoustic output generated by the aircraft.

7. The system as recited in claim 5, wherein said decoupler layer is tuned in thickness to a specific acoustic output generated by the aircraft.

8. The system as recited in claim 5, wherein a material of said composite core is selected to a specific acoustic output generated by the aircraft.

9. A method of acoustic absorption within an aircraft cabin comprising the step of:
    (1) tuning a multiple of acoustic absorption systems to a specific acoustic output generated by the aircraft, the multiple of acoustic absorption systems including an airframe batting, a primary soundproofing blanket at least partially over the airframe batting, and an interior trim panel at least partially over the primary soundproofing blanket.

10. A method as recited in claim 9, wherein said step (1) further comprises arranging the multiple of acoustic absorption system systems in a layered arrangement relative to an aircraft outer skin.

11. A method as recited in claim 9, wherein said step (1) further comprises tuning a material layer of a primary soundproofing blanket in thickness and density of the layers to the specific acoustic output generated by the aircraft.

12. A method as recited in claim 9, wherein said step (1) further comprises tuning a mass barrier layer of an interior trim panel in mass to a specific acoustic output generated by the aircraft.

13. A method as recited in claim 9, wherein said step (1) further comprises selecting a core composite material of an interior trim panel in response to a specific acoustic output generated by the aircraft.

14. A method as recited in claim 13, further comprises selecting a core composite material of an interior trim panel in response to a specific acoustic output generated by the aircraft.

15. A method as recited in claim 14, further comprises selecting a skin of the interior trim panel in response to the core composite material.

16. An aircraft section suitable for use in an aircraft, comprising:
    an airframe component having a multitude of frame members which define a void;
    a foam portion which provides an interference fit with said multitude of frame members;
    a mass barrier layer mounted to said multitude of frame members;
    a primary soundproofing blanket mounted to said airframe frame member and at least partially over said airframe batting said primary soundproofing blanket includes material layers tuned in thickness and density of the layers to a specific acoustic output generated by the aircraft; and an interior trim panel mounted to said airframe frame member and at least partially over said primary soundproofing blanket, said interior trim panel including a mass barrier layer mounted to a composite core to at least partially surround a decoupler layer, said mass barrier layer tuned in mass to the specific acoustic output generated by the aircraft.

17. The system as recited in claim 16, wherein said interior trim panel is mounted to an interior skeleton member, said interior skeleton member mounted to a vertical airframe frame member of said multitude of frame members.

18. The system as recited in claim 1, wherein said airframe batting, said primary soundproofing blanket and said interior trim panel are each tuned to a specific acoustic output generated by the aircraft.

19. The system as recited in claim 1, wherein said interior trim panel includes a mass barrier layer mounted to a composite core to at least partially surround a decoupler layer, said mass barrier layer tuned in mass to a specific acoustic output generated by the aircraft; said decoupler layer tuned in thickness to the specific acoustic output generated by the aircraft; said composite core selected to the specific acoustic output generated by the aircraft; and said primary soundproofing blanket includes material layers tuned in thickness and density to the specific acoustic output generated by the aircraft.

20. A method as recited in claim 9, wherein said step 1 further comprises the steps of:
    (a) tuning a mass barrier layer of an airframe batting to the specific acoustic output generated by the aircraft;
    (b) tuning a thickness of material layers and density of the material layers of a primary soundproofing blanket to the specific acoustic output generated by the aircraft; and
    (c) tuning a mass barrier layer of an acoustic absorption trim panel to the specific acoustic output generated by the aircraft.

21. A method as recited in claim 9, wherein said step 1 further comprises the steps of:
    (a) layering a primary soundproofing blanket over an airframe batting; and
    (b) layering an interior trim panel over the primary soundproofing blanket such that the layers are tuned to the specific acoustic output generated by the aircraft and to each of the preceding layers.

22. The system as recited in claim 1, wherein said airframe batting includes a foam portion.

23. The system as recited in claim 1, wherein said primary soundproofing blanket includes a soundproofing blanket having a multiple of material layers.

24. The system as recited in claim 1, wherein said interior trim panel includes an interior trim panel.

* * * * *